(12) United States Patent
Eltamaly et al.

(10) Patent No.: US 9,548,680 B2
(45) Date of Patent: Jan. 17, 2017

(54) SELF POWER SSHI CIRCUIT FOR PIEZOELECTRIC ENERGY HARVESTER

(71) Applicant: King Saud University, Riyadh (SA)

(72) Inventors: Ali M. Eltamaly, Riyadh (SA); Khaled Addoweesh, Riyadh (SA)

(73) Assignee: King Saud University, Riyadh (SA)

( * ) Notice: Subject to any disclaimer, the term of this patent is extended or adjusted under 35 U.S.C. 154(b) by 440 days.

(21) Appl. No.: 14/260,589

(22) Filed: Apr. 24, 2014

(65) Prior Publication Data

US 2015/0311824 A1 Oct. 29, 2015

(51) Int. Cl.
*H02N 2/18* (2006.01)

(52) U.S. Cl.
CPC .................... *H02N 2/181* (2013.01)

(58) Field of Classification Search
CPC ....................................... H02N 2/181
USPC ........................... 310/339, 319, 318
IPC ............................................ H02N 2/18
See application file for complete search history.

(56) References Cited

U.S. PATENT DOCUMENTS

| | | | |
|---|---|---|---|
| 6,376,968 B1 | 4/2002 | Taylor et al. | |
| 7,304,416 B2* | 12/2007 | Mullen | A43B 3/00 310/339 |
| 7,781,943 B1* | 8/2010 | Hamel | H02N 2/181 310/339 |
| 8,269,399 B2 | 9/2012 | Campbell | |
| 8,330,334 B2 | 12/2012 | Lee et al. | |
| 8,373,332 B2 | 2/2013 | Lee | |
| 2008/0252174 A1* | 10/2008 | Mohammadi | G01L 1/16 310/319 |

OTHER PUBLICATIONS

Ottman, G. K., H. F. Hofmann, K C. Bhaft, and G. A. Lesieutre, "Adaptive Piezoelectric Energy Harvesting Circuit for Wireless Remote Power Supply" 5, 2002, IEEE Transactions on Power Electronics, vol. 17, pp. 669-676.
Ottman, G. K., H. F. Hofmann, and G. A. Lesieutre, "Optimized Piezoelectric Energy Harvesting Circuit Using Step-down Converter in Discontinuous Conduction Mode" PESC Record—IEEE Annual Power Electronics Specialists conference, vol. 4, pp. 1988-1994.

(Continued)

*Primary Examiner* — Thomas Dougherty
*Assistant Examiner* — Karen B Addison
(74) *Attorney, Agent, or Firm* — Hauptman Ham, LLP

(57) ABSTRACT

A self-power synchronized switch harvesting on inductor circuit for harvesting energy from a piezoelectric element generating an AC voltage, comprises an envelope detector having first and second capacitors connected in parallel with the piezoelectric element and functioning as negative and positive voltage detectors. An inductor is connected in parallel with the capacitors, and transistors are connected in circuit with the capacitors and inductor and are responsive to a change in voltage across the first capacitor from positive to negative to enable flow of positive voltage to the inductor until terminal voltage reaches a certain amount and current in the inductor reaches zero. A full-wave rectifier is connected to convert the AC output of the piezoelectric element to DC voltage, and a DC-DC converter is connected to adapt the power output of the rectified voltage.

10 Claims, 3 Drawing Sheets

(56) References Cited

OTHER PUBLICATIONS

Ottman, G. K., Hofmann, H. F. Lesieutre, G. A., "Optimized piezoelectric energy harvesting circuit using step-down converter in discontinuous conduction mode," Power Electronics, IEEE Transactions on , vol. 18, No. 2, pp. 696, 703, Mar. 2003.

Rocha, J. G., Goncalves, L.M., Rocha, P.F., Silva, M. P., Lanceros-Mendez, S., "Energy Harvesting From Piezoelectric Materials Fully Integrated in Footwear," Industrial Electronics, IEEE Transactions on , vol. 57, No. 3, pp. 813, 819, Mar. 2010.

Harrist, Daniel W. "Wireless Battery Charging System Using Radio Frequency Energy Harvesting", Master Thesis, University of Pittsburgh, 2004.

E. Lefeuvre, D. Audigier, C. Richard, and D. Guyomar, "Buck-Boost Converter for Sensorless Power Optimization of Piezoelectric Energy Harvester", Sep. 2007, Transactions on Power Electronics vol. 22, pp. 2018-2025.

Rashed H. Bhuiyan, Roger A. Dougal, Mohammod Ali, "A Miniature Energy Harvesting Device for Wireless Sensors in Electric Power System", IEEE, Jul. 2010, vol. 10, pp. 1249-1258.

Y. K. Ramadass, A. P. Chandrakasan, "An Efficient Piezoelectric Energy Harvesting Interface Circuit Using a Bias-Flip Rectifier and Shared Inductor", Jan. 2010, IEEE Journal of Solid-State Circuits, vol. 45, pp. 189-204.

J. Han, A. Von Jouanne, T. Le, K. Mayaram, and T. Fiez, "Novel Power Conditioning Circuits for Piezoelectric Micro Sower Generators", 2004, 19th IEEE Applied Power Electronics Conference, pp. 1541-1546.

S. Guo and H. Lee, "An Efficiency-Enhanced Integrated CMOS Rectifier with Comparator-Controlled Switches for Transcutaneous Powered Implants", IEEE, 2007, IEEE Custom Integrated Circuits Conference, pp. 385-388.

Rajasekaran, A., Efficient Power Management for Vibration-Based Energy Harvesters, Thesis, The University of Texas at Dallas, 2009.

Tabesh, A. and Frechette, L.G., "A Low-Power Stand-Alone Adaptive Circuit for Harvesting Energy From a Piezoelectric Micropower Generator", IEEE, 2010, IEEE Transactions on Industrial Electronics, vol. 57, pp. 840-849.

Le, T.T., Han, J., von Jouanne, A., Mayaram, K. and Fiez, T.S., "Piezoelectric micro-power generation interface circuits", 2006, IEEE J. Solid-State, vol. 41, pp. 1411-1420.

Dallago, E., Frattini, G., Miatton, D., Ricotti, G. and Venchi, G., "Integrable high-efficiency AC-DC converter for piezoelectric energy scavenging system", 2007, IEEE Int. Conf. Portable Information Devices, pp. 1-5.

Hu, Jingzhen, "Optimal Design of Vibration-based Energy Harvesting Systems using Magnetostrictive Material (MsM)", [ed.] North Carolina State University, 2010.

Blaze Labs Research, http://blazelabs.com/e-exp15.asp. [Online], last time accessed Mar. 31, 2013.

Taylor, G.W., Burns, J.R., Kammann, S.A., Powers, W.B., Welsh, T.R., "The Energy Harvesting Eel: small subsurface ocean/river power generator," Oceanic Engineering, IEEE Journal of, vol. 26, No. 4, pp. 539-547, Oct. 2001.

Ando, B., Baglio, S., Trigona, C., Dumas, N., Latorre, L. and Nouet, P., "Nonlinear mechanism in MEMS devices for energy harvesting applications," Journal of Micromechanics and Microengineering, vol. 20, p. 1-12, 2010.

Lefeuvre, E., et al., "A comparison between several vibration-powered piezoelectric generators for standalone systems," 2006, Sens. Actuat. A: Phys., vol. 126, pp. 405-416.

Guyomar, D., Badel, A., Lefeuvre, E. and Richard, C., "Toward energy harvesting using active materials and conversion improvement by nonlinear processing", 4, 2005, IEEE Transactions on Ultrasonics, Ferroelectrics and Frequency Control, vol. 52, pp. 584-595.

Badel, A., Guyomar, D., Lefeuvre, E. and Richard, C., "Efficiency enhancement of a piezoelectric energy harvesting device in pulsed operation by synchronous charge inversion", 2005, J. Intell. Mater. Syst. Structures, vol. 16, p. 889-901.

D'hulst, R., Sterken, T., Puers, R. and Driesen, J., "Requirements for Power Electronics used for Energy Harvesting Devices", Tokyo, Japan : s.n., 2005, in Proc. Power MEMS, 5th Int. Workshop Micro and Nanotechnology for Power Generation and Energy Conversion Applications, pp. 53-56.

Lien, I.C., Shu, Y.C., Wu, W.J., Shiu, S.M., Lin, H.C., "Revisit of series—SSHI with comparisons to other interfacing circuits in piezoelectric energy harvesting", 2010, Smart Mater. Struct., vol. 16, pp. 125009-125021.

Zhu, L. and Chen, R., "A new synchronized switching harvesting scheme employing current doubler rectifier", 2012, Sensors and Actuators, vol. 174, pp. 107-114.

Liang, J. and Liao, W., Zhuhai/Macau, China, "An Improved Self-Powered Switching Interface for Piezoelectric Energy Harvesting", 2009, IEEE International Conference on Information and Automation, pp. 945-995.

* cited by examiner

SELF POWER SSHI CIRCUIT FOR PIEZOELECTRIC ENERGY HARVESTER

FIELD OF THE INVENTION

This invention relates to a self-power synchronized switch harvesting on inductor (SSHI) circuit and more particularly to a new self-powered SP-SSHI that uses only passive elements, i.e. two capacitors, to detect the flipping points of terminal voltage instead of using several resistors and diodes or integrated circuits as in an operational amplifier. Compared to existing circuits, the new circuit shows a significant reduction in losses, increased output powers, increased efficiency, lower cost and increased reliability.

BACKGROUND OF THE INVENTION

A need for a wireless electrical power supply has spurred an interest in piezoelectric energy harvesting on the extraction of electrical energy using a vibrating piezoelectric device according to G. K. Ottman et al. in an article entitled "Adaptive Piezoelectric Energy Harvesting Circuit for Wireless Remote Power Supply," IEEE Transaction on Power Electronics, Vol. 17, No. 5, September 2002. As stated therein, a vibrating piezoelectric device differs from a typical electric power supply in that its internal impedance is capacitive rather than inductive, and that it may be driven by mechanical vibration of varying amplitude and frequency.

Centimeter-scale piezoelectric elements generate milliwatt-range electric power using ambient vibration below 1 kHz. Such elements have recently been considered as a viable solution for long life micropower generators since they generate sufficient power to drive low-power electronic devices such as smart wireless sensors that consume less than a few milliwatts, as suggested by A. Tabesh et al. in an article entitled "A Low-Power Stand-Alone Adaptive Circuit for Harvesting Energy From a Piezoelectric Micropower Generator," published by the IEEE Transaction on Industrial Electronics, Vol. 57, No. 3, pp. 840-849, March 2010.

The aforementioned A. Tabesh et al. article discloses an adaptive energy-harvesting circuit with low power dissipation that is useful for efficient AC/DC voltage conversion of a piezoelectric micropower generator. The circuit operates stand-alone and extracts the piezoelectric strain energy independent of the load and piezoelectric parameters without using any external sensor. The circuit consists of a voltage-doubler rectifier, a step-down switching converter, and an analog controller operating with single supply voltage in the range of 2.5-15 volts. The controller uses the piezoelectric voltage as a feedback and regulates the rectified voltage to adaptively improve the extracted power. The nonscalable power dissipation of the controller unit is less than 0.05 mW, and the efficiency of the circuit is about 60% for output power levels above 0.5 mW. Experimental verifications of the circuit show the following: 1) the circuit notably increases the extracted power from a piezoelectric element compared to a simple full-bridge diode rectifier without control circuitry, and 2) the efficiency of the circuit is dominantly determined by its switching converter. The simplicity of the circuit facilitates the development of efficient piezoelectric energy harvesters for low-power applications such as wireless sensors and portable devices.

The concept of an autonomous electric device is no longer the subject of imagination according to Liya Ghu and Renwen Chen in an article entitled, "A New Synchronized Switch Harvesting Scheme Employing Current Doubler Rectifier," published by Sensors and Actuators, Vol. 174 (2012) 107-114. As disclosed therein, a piezoelectric energy harvester consists of three parts: a piezoelectric energy harvester structure working under vibration excitation, an electrical interface that converts the generated AC current into DC current compatible with most terminal electric loads and an energy storage device that accumulates and stores energy for intermittent use.

A U.S. patent of Campbell, U.S. Pat. No. 8,269,399 B2, discloses a system and apparatus for harvesting energy. This patent discloses a sensor assembly including a transducer and a control module coupled with the transducer. The control module is configured to selectively switch the sensor assembly between a first mode of operation wherein the sensor assembly measures an amount of energy induced to the sensor assembly, and a second mode of operation wherein the sensor assembly stores an amount of energy induced to the sensor assembly.

A U.S. patent of Lee et al., U.S. Pat. No. 8,373,332 B2 issued on Feb. 12, 2013 discloses an energy harvesting electric device that is capable of increasing output power. The energy harvesting electric device includes an energy harvesting array having a plurality of energy harvesters, a single rectifier connected to the energy harvester array, and an output unit which is connected to the single rectifier and has a load resistance. The energy harvesters include a plurality of first energy harvesters connected to each other in parallel and a single second energy harvester connected in parallel to the first energy harvesters. The first energy harvesters have a first specific resistance higher than the load resistance and the second energy harvester has a second specific resistance higher than the first specific resistance.

Piezoelectric energy harvesters have been used to feed loads in military, non-military and many other applications. Many techniques have been used to extract the maximum power from piezoelectric materials. For example, a considerable amount of power is dissipated in the piezoelectric materials to flip the output voltage through an internal capacitor and resistor of a piezoelectric device. One approach to harvest this power is the synchronized switch harvesting on inductor technique. Other circuits use the accumulated power in a battery to feed the circuit to detect the flipping points of piezoelectric harvesters.

The output power from piezoelectric energy harvesting (PEH) is an AC current with amplitude and frequency depending on the mechanical stress on a piezoelectric material and the electric circuit connected to it. The equivalent circuit for a piezoelectric device PZT is a current source in shunt with a resistor and a capacitor as shown in FIG. 1. The power generated from a piezoelectric energy harvester is very small to be used to feed loads directly and it is not suitable to be used in most of the applications without battery storage or super-capacitor to accumulate the generated power to be used when required. For this reason, a rectifier should be used to convert AC to DC power.

The literature recommended using a diode bridge rectifier [1] rather than half-wave diode rectifier. Also, a voltage multiplier can be used to increase the dc output power extracted from PEH [2]. Voltage multipliers increase the output voltage from a piezoelectric energy harvester and extend the operating range of piezoelectric energy harvester [3]. The DC output power from a rectifier may be used directly to feed a load or to charge a storage device as for example a Standard PEH, SPEH [4] as shown in FIG. 1. This technique is characterized by high output voltage and low current which is not suitable for small battery storage with low voltage. Operating a PEH circuit in low voltage will considerably reduce the efficiency and the extracted power.

Therefore, a device that can interface a battery having low voltage with high output voltage from a piezoelectric device is required.

Ottman and et. al. [5] and [6] introduced the first DC-DC buck converter to interface the low voltage battery with high voltage output from a piezoelectric device. Ottman and et. al. claim that the power extracted from a piezoelectric device is increased by 400% in [5] and 325% in [6] and [7] as compared to when the battery was directly charged with a piezoelectric element-rectifier circuit without a DC-DC converter (SPEH of FIG. 1). Due to the step down only characteristics of a buck converter other articles introduce a buck-boost converter to extend the operating range of the converter to work as a step-down or step-up [8], [9].

Fly-hack converters discussed in some articles extend the operating limits of the piezoelectric energy harvester [10]. In most cases the DC-DC converter is a must because it extends the operating range, increases the power extracted from a piezoelectric energy harvesting circuit, and considerably increases piezoelectric energy harvesting efficiency. The transition of the piezoelectric device output voltage between its peaks happens when the load is isolated from the piezoelectric device (all rectifier diodes are in OFF state), as shown in FIG. 2, which dissipates a considerable amount of energy through an internal capacitor and resistor of the piezoelectric device. This considerably reduces the extracted energy and efficiency of the piezoelectric energy harvesting circuit. Flipping the voltage through an inductor at short time can extract most of this dissipated power to the load and increases the output power considerably. This technique is known as Synchronized Switch Harvesting on Inductor (SSHI). This technique was first introduced by [11]. The authors claim that the technique exhibits an output power increase by over 900% compared to the same piezoelectric system with SPEH that shown in FIG. 1.

Some researchers used inductor in parallel with PZT [11] [12], [13], [14], [15], [16] and others used the inductor in series [17], [18]. Depending on the results and comparison of literatures it has been concluded that the parallel SSHI technique is considered one of the best techniques that have been used to flip the output voltage of the piezoelectric device. This is the reason it has been used in this research. Two different techniques can be used for driving the parallel SSHI circuit. One is called self-power SSHI (SP-SST-II) [12], [19], [20], [21] in which the generated power feeds the auxiliary circuits to detect the correct points to flip the terminal voltage of the piezoelectric energy harvesting circuit. Some other researchers used accumulated energy in the battery (BD-SSHI) to feed the driving circuit [22], [23] of parallel SSHI. BD-SSHI used the battery power or any auxiliary circuit to feed the integrated circuits that used to detect the peaks and to drive the SSHI circuit. BD-SSHI technique suffers from low efficiency and it is not self-started when the battery loses its charge. SP-SSHI technique used the peak detector circuit to detect the time to switch ON or OFF the switches to flip the voltage across a piezoelectric device through the inductor L and Cp [24]. This circuit is accomplished by using a differentiating circuitry that senses the slope of the capacitor's voltage (dv/dt), and a comparator to switch two metal oxide-semiconductor field effect transistors (MOSFETs) in series with the SSHI inductor. The differentiating circuit has been accomplished by RC circuit that detects the absolute peaks of the piezoelectric device terminal voltage when it starts to change its direction. The signal should be supplied to the comparator to switch MOSFETs. The main idea here is the biasing voltage can be obtained by charging two capacitors through half-wave rectifiers. This circuit [24] dissipated a considerable amount of power in feeding and biasing the comparator and other elements of the circuit.

The other peak detector circuit is shown FIG. 3. The flipping technique used in this circuit has been first introduced by [25]. This technique has been used widely in many researches such as [20]. This circuit used peak detector circuits having 8 diodes, 4 transistors, three capacitors, and two resistors. In this circuit, two voltage inversions and one charge neutralization are experienced for exerting each switching action. In case of switching on positive peak voltage, $R_1$, $D_1$ and $C_1$ form an envelope detector. $T_3$, $D_3$ and $T_1$ will be switched ON and the current will resonate through SSHI inductor and $D_5$ and $D_8$. In the same way, switching on negative peak voltage, $R_2$, $D_2$ and $C_2$ form an envelope detector. $T_4$, $D_4$ and $T_2$ will switch ON and the current will resonate through SSHI inductor and $D_6$ and $D_7$. The load can be connected across the capacitor C or it can be connected after using diode bridge rectifier and DC-DC converter. The current and voltage waveforms of piezoelectric energy harvesting circuit using parallel SSHI technique is shown in FIG. 4.

Notwithstanding the above, it is presently believed that there is a need and a potential commercial market for a novel piezoelectric energy harvester using a self-power SSHI circuit as disclosed in the present invention. There should be a demand and a commercial market for such devices because such devices use passive elements, i.e. two capacitors, to detect the flipping points of terminal voltage, rather than the many active elements such as resistors, diodes and op-amps that are used in conventional circuits. Further, Applicants' self-powered synchronized switch harvesting on inductor circuit showed a significant reduction in losses, increased output power, increased efficiency, low costs and increased reliability.

SUMMARY OF THE INVENTION

The present invention relates to a new self-power synchronized switch harvester on inductor device which uses two capacitors (passive elements) to detect the flipping point of terminal voltage and replaces many active elements as used on other circuits, such as resistors, diodes and operational amplifiers. The new circuit showed a significant reduction in losses, increased output powers, increased efficiency, low costs and increased reliability.

The invention will now be described in connection with the accompanying drawings.

DESCRIPTION OF THE PREFERRED EMBODIMENT OF THE INVENTION

Figure 1:
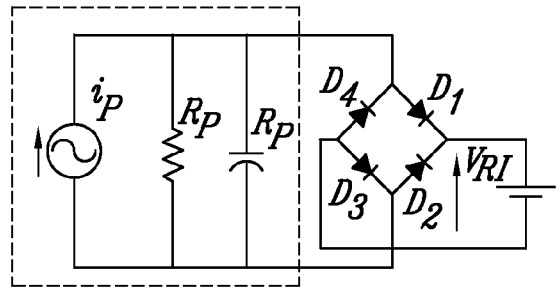
FIG. 1 is a standard piezoelectric energy harvester circuit diagram.
Figure 2:
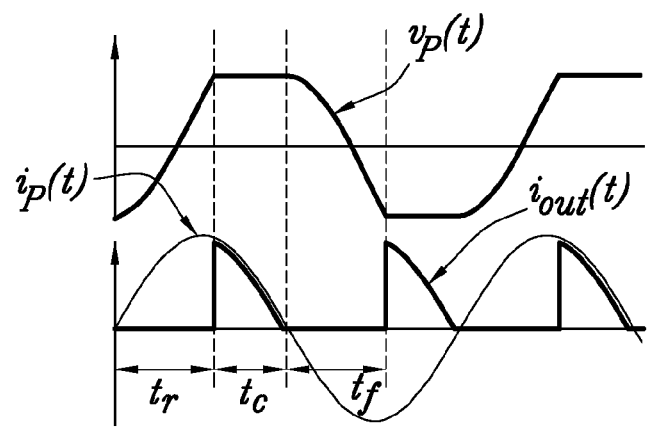
FIG. 2 is a graphical illustration of the terminal voltage and supply current of a standard piezoelectric energy harvester.
Figure 3:
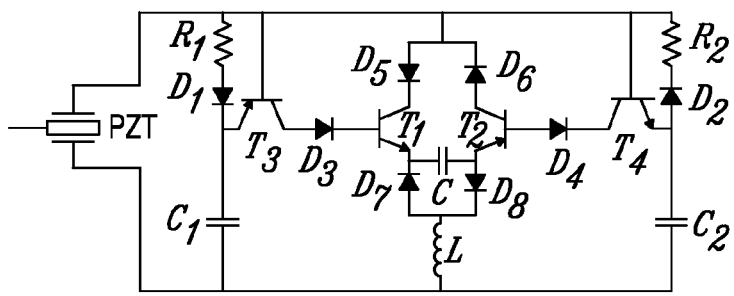
FIG. 3 is a circuit diagram of a prior self-powered synchronized switch harvester on inductor.
Figure 4:
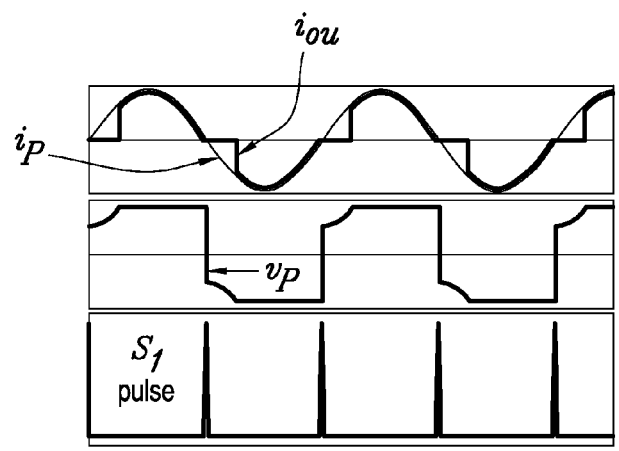
FIG. 4 is a graphical illustration of the current and voltage waveforms of the self-powered piezoelectric harvester on inductor shown in FIG. 3.

The self-power synchronized switch harvesting on inductor circuit of the invention for harvesting energy from a piezoelectric element comprises an envelope detector having passive elements connected in parallel with the piezoelectric element and functioning as negative and positive voltage detectors. An inductor is connected in parallel with the capacitors, and switch means are connected in circuit with the capacitors and inductor to control flipping of positive and negative voltage from the piezoelectric element to the inductor. A full-wave rectifier is connected in the circuit to convert the AC output of the piezoelectric element to DC voltage, and a DC-DC converter is connected to receive the rectified voltage and supply it to a load. An equivalent circuit for a piezoelectric element, including the piezoelectric element PZT of the present invention, includes an internal capacitor $C_p$ as depicted in the area bounded by broken lines in FIG. 1.

Figure 5:
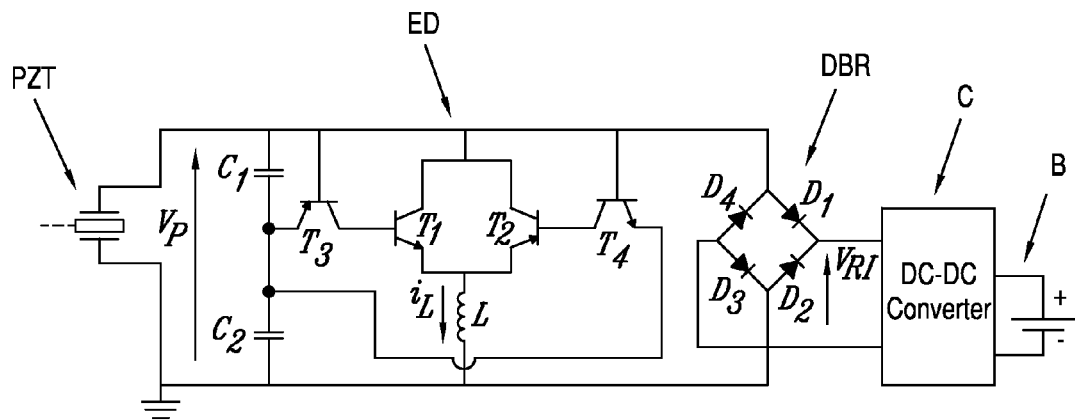
FIG. 5 is a circuit diagram of a self-powered synchronized switch harvester on inductor in accordance with the present invention.

In a preferred embodiment, and with particular reference to FIG. 5, the passive elements comprises a first capacitor $C_1$ and a second capacitor $C_2$ connected across said piezoelectric element, and the switch means comprises first and second transistors $T_1$ and $T_2$ connected in parallel with one another and in series with inductor L, and third and fourth transistors $T_3$ and $T_4$ connected with the bases of said first and second transistors to turn them ON and OFF. The rectifier is a diode bridge rectifier DBR consisting of four diodes $D_1$-$D_4$ connected in a bridge. A DC-DC converter C adapts the power output of the circuit.

The first transistor $T_1$ is an NPN transistor and the second transistor $T_2$ is a PNP transistor. The capacitance value of $C_1$ is lower than the value of $C_2$ (about 0.1 nF and 1 nF, respectively), which makes the voltage across $C_1$ change faster than that across $C_2$. The voltage across $C_1$ controls transistors $T_3$ and $T_4$. Third transistor $T_3$ has its base and emitter connected, respectively, across the first capacitor $C_1$, and its collector connected with the base of the first transistor $T_1$, said third transistor functioning to turn ON the first transistor when the voltage across the first capacitor $C_1$ changes from positive to negative to thereby enable said flow of power through said first transistor $T_1$ to said inductor. The fourth transistor $T_4$ has its base and emitter connected, respectively, across the first capacitor $C_1$, and its collector connected with the base of the second transistor $T_2$, said fourth transistor functioning to turn ON said second transistor when the voltage across said first capacitor $C_1$ changes from negative to positive to thereby enable said flow of power through said first transistor to said inductor. The first transistor $T_1$ is operative to pass positive voltage from the piezoelectric element to the inductor and the second transistor $T_2$ is operative to pass negative voltage from the piezoelectric element to the inductor.

Figure 6:
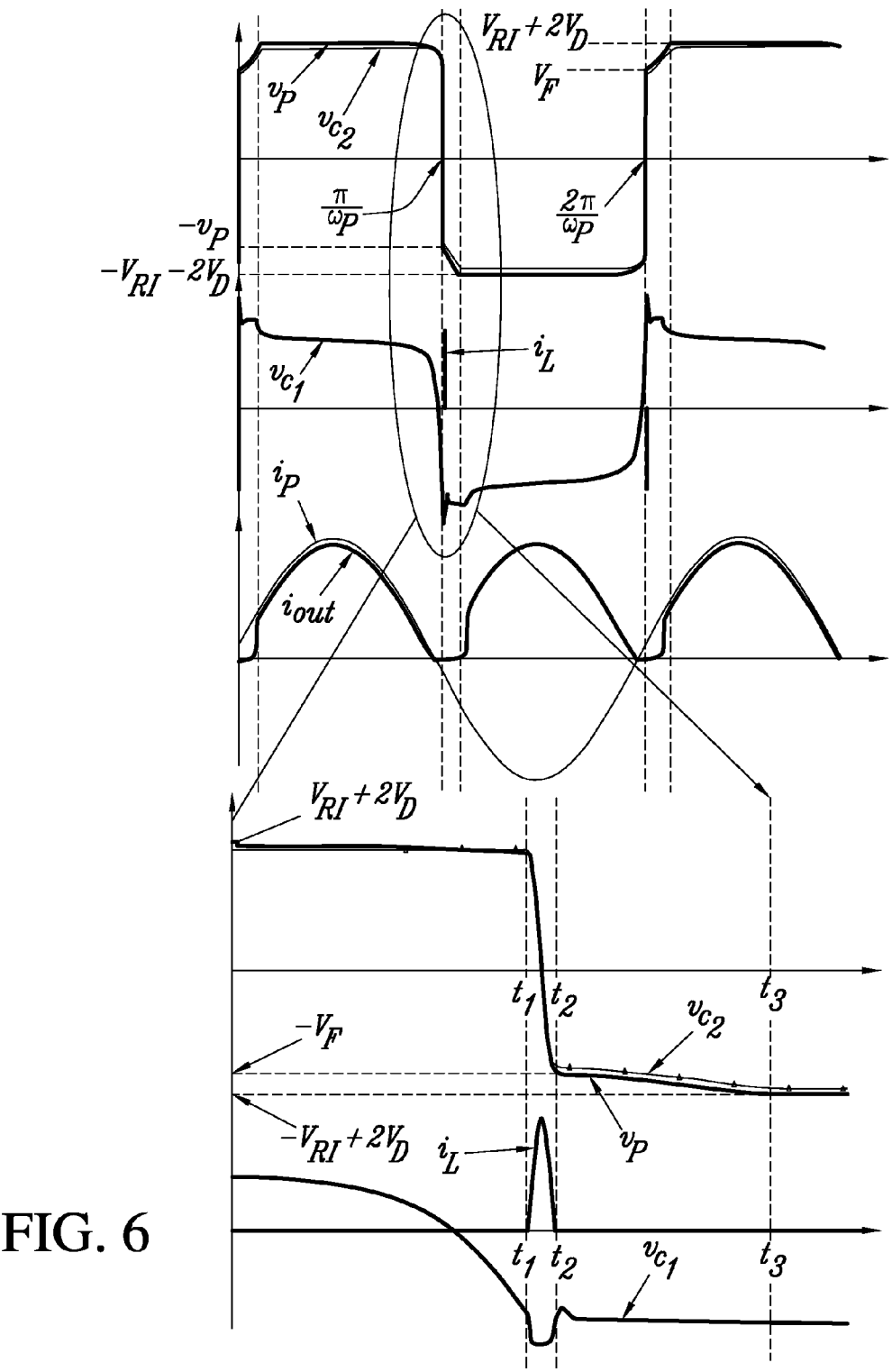
FIG. 6 is a graphical illustration of the current and voltage waveforms of the synchronized switch harvester on inductor in accordance with the present invention as shown in FIG. 5.

Operation of the circuit is as follows, wherein FIG. 6 shows the voltage and current waveforms for the voltages across and current through each element of the new proposed circuit.

Stage 1: When the output voltage $v_p(t)$ is equal to $V_{Rf}+2V_D$ ($V_D$ is the forward voltage drop across each diode), the voltage across the capacitor $C_1$ is $V_{BE}$ which forces transistor $T_3$ to its OFF state and consequently transistor $T_1$ will also be OFF. During this time transistor $T_4$ is in a forward state but it cannot switch transistor $T_2$ to be in an ON state because the voltage $V_{CE}$ of $T_2$ is positive. Thus, during this state all transistors are in the OFF state and the power of the piezoelectric device PZT passes to the output through diodes $D_1$ and $D_3$. Once the terminal voltage $v_p(t)$ becomes lower than $V_{Rf}+2V_D$ at t=0, all diodes of the diode bridge rectifier will switch OFF. The voltage on capacitor $C_2$ remains almost constant $(V_{Rf}+2V_D)$ because of its high time constant. The voltage across capacitor $C_1$ $(V_{C1}=V_P-V_{C2})$ will flip from positive to negative during 0<t<t1. Thus, the main function of $C_2$ during this stage is to force the voltage of $C_1$ to flip from positive to negative when the terminal voltage of PZT becomes lower than $V_{Rf}+2V_D$. Once the voltage of $C_1$ reaches $-V_{BE}$ the transistor $T_3$ will switch ON and consequently force $T_1$ to switch ON, whereupon the positive voltage stored in capacitor $C_1$ will discharge through the inductor L. This flipping period will continue until the current in the inductor reaches zero (from $t_1$ to $t_2$) when the terminal voltage $v_p(t)$ reaches a certain amount (-VF). After that (from $t_2$ to $t_3$), transistors $T_3$ and $T_1$ will again switch OFF because the current through the collector of transistor $T_1$ (inductor current) reaches zero. During this period ($t_2$ to $t_3$), the source current alone will charge the internal capacitor $C_p$ in the piezoelectric device PZT to reach the value of $-(V_{Rf}+2V_D)$. All diodes remain switched OFF during this period ($t_2$ to $t_3$).

Stage 2: Once the voltage $v_p$ reaches the value of $-(V_{Rf}+2V_D)$, the voltage across the capacitor $C_1$ is $-V_{BE}$, which makes transistor $T_4$ be in the OFF state and consequently $T_2$ will also be OFF. During this time transistor $T_3$ is in its forward state but it cannot switch transistor $T_1$ to its ON state because the voltage $V_{CE}$ of $T_1$ is negative. Thus, during this state all transistors are in their OFF state and the power of the piezoelectric device PZT will pass to the output through diodes $D_2$ and $D_4$. Once the value of output voltage $v_p(t)$ becomes higher than $-(V_{Rf}+2V_D)$, all diodes of the diode bridge rectifier will switch OFF. The voltage across C2 remains almost constant $(-(V_{Rf}+2V_D))$ because of its high time constant. The voltage across capacitor $C_1$ $(V_{C1}=V_P-V_{C2})$ will flip from negative to positive. Thus, the main function of $C_2$ during this stage is to force the voltage of $C_1$ to flip from negative to positive when the terminal voltage of PZT becomes higher than $-(V_{Rf}+2V_D)$, which forces $T_4$ to be ON and consequently forces $T_2$ to also become ON and the negative voltage in the internal capacitor $C_p$ will flow through the inductor L. This flipping period will continue until the current in the inductor reaches zero and the terminal voltage $v_p(t)$ reaches $V_F$. After that, $T_4$ and $T_2$ will switch OFF again and the source current alone will charge the capacitor $C_p$ to reach the value of $(V_{Rf}+2V_D)$. During this period all diodes remain switched OFF. Once the output voltage $v_p(t)$ reaches the value of $V_{Rf}+2V_D$, $D_1$ and $D_3$ will switch ON again and stage 1 will be repeated.

While the invention has been disclosed in connection with the preferred embodiments it should be recognized that changes and modifications may be made therein without departing from the scope of the appended claims.

REFERENCES

[1] Ottman, G. K., H. F. Hofmann, A. C. Bhaft, and G. A. Lesieutre, "Adaptive Piezoelectric Energy Harvesting Circuit for Wireless Remote Power Supply" 5, 2002, *IEEE Transactions on Power Electronics*, Vol. 17, pp. 669-676.

[2] Ottman, G. K., H. F. Hofmann, and G. A. Lesieutre, "Optimized Piezoelectric Energy Harvesting Circuit Using Step-down Converter in Discontinuous Conduction Mode" *PESC Record-IEEE Annual Power Electronics Specialists Conference*, Vol. 4, pp. 1988-1994.

[3] Ottman, G. K., Hofmann, H. F. Lesieutre, G. A., "Optimized piezoelectric energy harvesting circuit using step-down converter in discontinuous conduction mode," *Power Electronics, IEEE Transactions on*, vol. 18, no. 2, pp. 696, 703, March 2003.

[4] Rocha, J. G., Goncalves, L. M., Rocha, P. F., Silva, M. P., Lanceros-Mendez, S., "Energy Harvesting From Piezoelectric Materials Fully Integrated in Footwear," *Industrial Electronics, IEEE Transactions on*, vol. 57, no. 3, pp. 813, 819, March 2010

[5] Harrist, Daniel W. "WIRELESS BATTERY CHARGING SYSTEM USING RADIO FREQUENCY ENERGY HARVESTING", Master Thesis, University of Pittsburgh, 2004.

[6] E. Lefeuvre, D. Audigier, C. Richard, and D. Guyomar, "Buck-Boost Converter for Sensorless Power Optimization of Piezoelectric Energy Harvester", September 2007, Transactions on Power Electronics, Vol. 22, pp. 2018-2025.

[7] Rashed H. Bhuiyan, Roger A. Dougal, Mohammod Ali, "A Miniature Energy Harvesting Device for Wireless Sensors in Electric Power System", IEEE, July 2010, Vol. 10, pp. 1249-1258.

[8] Y. K. Ramadass, A. P. Chandrakasan, "An Efficient Piezoelectric Energy Harvesting Interface Circuit Using a Bias-Flip Rectifier and Shared Inductor", January 2010, IEEE JOURNAL OF SOLID-STATE CIRCUITS, Vol. 45, pp. 189-204.

[9] J. Han, A. Von Jouanne, T. Le, K. Mayaram, and T. Fiez, "Novel Power Conditioning Circuits for Piezoelectric Micro Power Generators", 2004, 19th IEEE Applied Power Electronics Conference, pp. 1541-1546.

[10] S. Guo and H. Lee, "An Efficiency-Enhanced Integrated CMOS Rectifier with Comparator-Controlled Switches for Transcutaneous Powered Implants", IEEE, 2007, IEEE Custom Integrated Circuits Conference.

[11] Rajasekaran, A., EFFICIENT POWER MANAGEMENT FOR VIBRATION-BASED ENERGY HARVESTERS, Thesis, The University of Texas at Dallas, 2009.

[12] Tabesh, A. and Frechette, L. G., "A Low-Power Stand-Alone Adaptive Circuit for Harvesting Energy From a Piezoelectric Micropower Generator", IEEE, 2010, IEEE Transactions on Industrial Electronics, Vol. 57, pp. 840-849.

[13] T. Le, J. Han, A. von Jouanne, K. Mayaram, and T. Fiez, "Piezoelectric micro-power generation interface circuits", 2006, IEEE J. Solid-State, Vol. 41, pp. 1411-1420.

[14] E. Dallago, G. Frattini, D. Miatton, G. Ricotti, and G. Venchi, "Integrable high-efficiency AC-DC converter for piezoelectric energy scavenging system", 2007, IEEE Int. Conf. Portable Information Devices, pp. 1-5.

[15] Hu, Jingzhen, "Optimal Design of Vibration-based Energy Harvesting Systems using Magnetostrictive Material (MsM)", [ed.] North Carolina State University, 2010.

[16] Blaze Labs Research, http://blazelabs.com/e-exp15.asp. [Online], last time accessed 31 Mar. 2013.

[17] Taylor, G. W., Burns, J. R., Kammann, S. A., Powers, W. B., Welsh, T. R., "The Energy Harvesting Eel: a small subsurface ocean/river power generator," *Oceanic Engineering, IEEE Journal of*, vol. 26, no. 4, pp. 539-547, October 2001.

[18] B. Ando, S. Baglio, C. Trigona, N. Dumas, L. Latorre, and P. Nouet, "Nonlinear mechanism in MEMS devices for energy harvesting applications," Journal of Micromechanics and Microengineering, vol. 20, p. 1-12, 2010.

[19] Lefeuvre, E., et al., "A comparison between several vibration-powered piezoelectric generators for standalone systems," 2006, Sens. Actuat. A: Phys. Vol. 126, pp. 405-416.

[20] Daniel. Guyomar, Adrien Badel, Elie Lefeuvre, and Claude Richard, "Toward energy harvesting using active materials and conversion improvement by nonlinear processing", 4, 2005, IEEE Transactions on Ultrasonics, Ferroelectrics and Frequency Control, Vol. 52, pp. 584-595.

[21] A. Badel, D. Guyomar, E. Lefeuvre, and C. Richard, "Efficiency enhancement of a piezoelectric energy harvesting device in pulsed operation by synchronous charge inversion", 2005, J. Intell. Mater. Syst. Structures, Vol. 16, p. 889.

[22] R. D'hulst, T. Sterken, R. Puers, and J. Driesen, "Requirements for Power Electronics used for Energy Harvesting Devices", Tokyo, Japan: s.n., 2005, in Proc. Power MEMS, 5th Int. Workshop Micro and Nanotechnology for Power Generation and Energy Conversion Applications, pp. 53-56.

[23] I. C. Lien, Y. C. Shu, W. J. Wu, S. M. Shiu, H. C. Lin, "Revisit of series-SSHI with comparisons to other interfacing circuits in piezoelectric energy harvesting", 2010, Smart Mater. Struct., Vol. 16, pp. 125009-125021.

[24] L. Zhu and R. Chen, "A new synchronized switching harvesting scheme employing current doubler rectifier", 2012, Sensors and Actuators, Vol. 174, pp. 107-114.

[25] J. Liana and W. Liao, Zhuhai/Macau, China, "An Improved Self-Powered Switching Interface for Piezoelectric Energy Harvesting", 2009, IEEE International Conference on Information and Automation, pp. 945-95.

What is claimed is:

1. A self-power synchronized switch harvesting on inductor circuit for harvesting energy from a piezoelectric element generating an AC voltage, comprising:
   an envelope detector comprising first and second capacitors connected in parallel with said piezoelectric element, said capacitors functioning as negative and positive voltage detectors;
   an inductor connected in parallel with said capacitors;
   switch means connected in circuit with said inductor, said switch means being responsive to a change in voltage across said first capacitor from positive to negative to enable flow of positive voltage to and through said inductor until terminal voltage reaches a certain amount and current in the inductor reaches zero; and
   a full-wave rectifier connected in said circuit to convert the AC output of said piezoelectric element to DC voltage.

2. The circuit as claimed in claim 1, wherein:
   a DC-DC converter is connected to receive the DC voltage from said rectifier.

3. The circuit as claimed in claim 2, wherein:
   the DC-DC converter is a step up converter.

4. The circuit as claimed in claim 2, wherein:
   the switch means includes a pair of transistors connected in parallel with one another and in series with the inductor, a first transistor of said pair of transistors being operative to pass positive voltage from the piezoelectric element to the inductor and a second transistor of said pair of transistors being operative to pass negative voltage from the piezoelectric element to the inductor.

5. The circuit as claimed in claim 4, wherein:
said first transistor in said pair of transistors comprises an NPN transistor and the second transistor in said pair of transistors comprises a PNP transistor;
a third transistor has its base and emitter connected, respectively, across said first capacitor, and its collector connected with the base of said first transistor, said third transistor functioning to turn ON said first transistor when the voltage across said first capacitor changes from positive to negative to thereby enable said flow of power through said first transistor to said inductor; and
a fourth transistor has its base and emitter connected, respectively, across said first capacitor, and its collector connected with the base of said second transistor, said fourth transistor functioning to turn ON said second transistor when the voltage across said first capacitor changes from negative to positive to thereby enable said flow of power through said first transistor to said inductor.

6. The circuit as claimed in claim 5, wherein:
said rectifier is a diode bridge rectifier.

7. The circuit as claimed in claim 6, wherein in a stage 1:
the voltage across said first capacitor is $V_{BE}$ when the output voltage $v_p(t)$ of the piezoelectric element is equal to $V_{RI}+2V_D$, which forces said third transistor to its OFF state and consequently said first transistor will also be OFF;
said fourth transistor is in a forward state when the output voltage $v_p(t)$ of the piezoelectric element is equal to $V_{RI}+2V_D$, but it cannot switch said second transistor to be in an ON state because the voltage $V_{CE}$ of said second transistor is positive, whereby during this state all transistors are in the OFF state and the power of the piezoelectric element passes to the output through first and second diodes in the diode bridge rectifier;
all diodes of the diode bridge rectifier switches OFF when the terminal voltage $v_p(t)$ becomes lower than $V_{RI}+2V_D$ at t=0, and the voltage across said first capacitor changes from positive to negative during the time from t=0 to t=$t_1$;
said third transistor switches ON when the voltage of said first capacitor reaches $-V_{BE}$ and consequently forces said first transistor to switch ON, whereupon positive voltage stored in said first capacitor discharges through said inductor;
said first and third transistors switch OFF from $t_4$ to $t_1$ because the current through the collector of said first transistor reaches zero, and all diodes in said bridge rectifier remain switched OFF during this period, flipping of said circuit continuing until current in the inductor reaches zero in the period from $t_3$ to $t_4$ when the terminal voltage $v_p(t)$ reaches $-V_F$; and
from $t_4$ to $t_1$ all diodes remain switched OFF and said first and third transistors switch OFF again because the inductor current through the collector of the first transistor reaches zero and source current alone charges an internal capacitor in the piezoelectric element to reach the value of $-(V_{RI}+2V_D)$.

8. The circuit as claimed in claim 7, wherein:
the second capacitor has a high time constant whereby the voltage thereon remains almost constant;
when the terminal voltage of PZT becomes lower than $V_{RI}+2V_D$ the second capacitor forces the voltage across the first capacitor to flip from positive to negative during 0<t<t1; and
the third transistor switches ON and consequently forces the first transistor to switch ON when the voltage of the first capacitor reaches $-V_{BE}$, whereupon the positive voltage stored in the first capacitor discharges through the inductor.

9. The circuit as claimed in claim 8, wherein in a stage 2:
the voltage across said first capacitor is $-V_{BE}$ and said second and fourth transistors are OFF when the voltage $v_p$ reaches the value of $-(V_{RI}+2V_D)$ and during this time said third transistor is in a forward state but it cannot switch said first transistor to its ON state because the voltage $V_{CE}$ of said first transistor is negative, whereby during this state all transistors are in an OFF state and the output of the piezoelectric element passes through third and fourth diodes to a battery;
all diodes of the diode bridge rectifier switch OFF and the voltage across said first capacitor changes from negative to positive, forcing said fourth transistor to be ON and consequently forcing said second transistor to become ON when the value of output voltage $v_p(t)$ becomes higher than $-(V_{RI}+2V_D)$, whereby negative voltage in the internal capacitor of said piezoelectric element flows freely through the inductor;
flipping of said circuit continuing until the current in the inductor reaches zero when the terminal voltage $v_p(t)$ reaches $V_F$, said second and fourth transistors then switching OFF again and the source current alone charging the internal capacitor to reach the value of $(V_{RI}+2V_D)$, during which all diodes remain switched OFF until the output voltage $v_p(t)$ reaches the value of $V_{RI}+2V_D$, at which time two of said diodes will switch ON again and stage 1 will be repeated again.

10. The circuit as claimed in claim 9, wherein:
when the terminal voltage of PZT becomes higher than $-(V_{RI}+2V_D)$ the second capacitor forces the voltage across the first capacitor to flip from negative to positive.

* * * * *